(12) United States Patent
Tian et al.

(10) Patent No.: US 11,723,074 B2
(45) Date of Patent: Aug. 8, 2023

(54) WIRELESS COMMUNICATION WITH CONFLICT AVOIDANCE

(71) Applicant: ZTE Corporation, Guangdong (CN)

(72) Inventors: Li Tian, Guangdong (CN); Jianqiang Dai, Guangdong (CN); Junfeng Zhang, Guangdong (CN); He Huang, Guangdong (CN); Yuzhou Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 171 days.

(21) Appl. No.: 17/262,131

(22) PCT Filed: Apr. 30, 2019

(86) PCT No.: PCT/CN2019/085205
§ 371 (c)(1),
(2) Date: Jan. 21, 2021

(87) PCT Pub. No.: WO2020/220267
PCT Pub. Date: Nov. 5, 2020

(65) Prior Publication Data
US 2022/0086912 A1      Mar. 17, 2022

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01); *H04W 74/008* (2013.01)

(58) Field of Classification Search
CPC ............. H04W 74/004; H04W 74/008; H04W 74/0833
See application file for complete search history.

(56) References Cited

U.S. PATENT DOCUMENTS

| | | | |
|---|---|---|---|
| 11,129,201 B2 * | 9/2021 | Martin | H04W 74/0833 |
| 2006/0153112 A1 | 7/2006 | Lim et al. | |

(Continued)

FOREIGN PATENT DOCUMENTS

| | | |
|---|---|---|
| CN | 101889466 A | 11/2010 |
| CN | 102450079 A | 5/2012 |

(Continued)

OTHER PUBLICATIONS

Extended European Search Report for EP application No. 19 92 7175.0, dated Jun. 4, 2021, 7p.

(Continued)

*Primary Examiner* — Kashif Siddiqui
(74) *Attorney, Agent, or Firm* — Crowell & Moring LLP (57) ABSTRACT

This disclosure relates to wireless communication formats that avoid conflicts in message transmissions. In one implementation, conflicts are avoided by determining that transmitting the uplink message according to a first transmission format will result in a conflict, and responsively determining to transmit the uplink message according to a second transmission format. In another implementation, conflicts are avoided by waiting to transmit a message part until a next time unit of a physical channel that is not conflicted. In (Continued)

another implementation, conflicts are avoided by configuring time units of a second physical channel relative to time units of a first physical channel according to an uplink time unit offset.

12 Claims, 6 Drawing Sheets

(56) References Cited

U.S. PATENT DOCUMENTS

| | | | |
|---|---|---|---|
| 2006/0227778 A1 | 10/2006 | Jin et al. | |
| 2012/0176971 A1 | 7/2012 | Pani et al. | |
| 2013/0242815 A1* | 9/2013 | Wang | H04L 1/1854 370/280 |
| 2018/0212738 A1 | 7/2018 | Chun et al. | |
| 2019/0357267 A1* | 11/2019 | Martin | H04W 74/0833 |
| 2020/0100299 A1* | 3/2020 | Loehr | H04W 80/02 |
| 2022/0132572 A1* | 4/2022 | Fang | H04W 74/0808 |

FOREIGN PATENT DOCUMENTS

| | | |
|---|---|---|
| CN | 105594285 A | 5/2016 |
| EP | 3 349 505 A1 | 7/2018 |
| EP | WO 2018/127549 A1 | 7/2018 |
| WO | WO 2006/075870 A1 | 7/2006 |
| WO | WO 2006/109923 A2 | 10/2006 |
| WO | WO 2009/042849 A2 | 4/2009 |
| WO | WO 2017/155239 A2 | 9/2017 |
| WO | WO-2018127549 A1 * | 7/2018 ............ H04W 28/08 |
| WO | WO-2019064768 A1 * | 4/2019 ........ H04W 74/0833 |

OTHER PUBLICATIONS

International Search Report of PCT/EP2018/050239 (WO 2018/127549 A1), dated Mar. 21, 2018, 3p.

International Search Report of international application No. PCT/CN2019/085205, dated Jan. 23, 2020; 4p.

Written Opinion of the International Searching Authority of international application No. PCT/CN2019/085205, dated Jan. 23, 2020; 4p.

First Chinese Office Action dated Jun. 21, 2022 for Chinese Application No. 201980095996.X, including English translation.

NTT Docomo, Inc., "Discussion on Channel Structure for Two-Step RACH"; 3GPP TSG-RAN WG1 #96BIS; Xi'an, China; R1-1904944, Apr. 12, 2019; 4 pages.

NTT Docomo, Inc.; "Discussion on Procedure for Two-Step RACH"; 3GPP TSG-RAN WG1 #96bis; Xi'an, China; R1-1904945, Apr. 8-12, 2019; 6 pages.

Japanese Office Action dated Feb. 9, 2023 for Japanese Application No. 2021-503780 (11 pages, with English translation).

Australian Examination Report dated Mar. 24, 2023 for Australian Application No. 2019443820 (2 pages).

Indian Examination Report dated Mar. 15, 2023 for Indian Aplication No. 202117003134 (6 pages).

* cited by examiner

WIRELESS COMMUNICATION WITH CONFLICT AVOIDANCE

CROSS-REFERENCE TO RELATED APPLICATION

This application is a national stage application, filed under 35 U.S.C. § 371, of International Patent Application No. PCT/CN2019/085205, filed with the China National Intellectual Property Administration, PRC on Apr. 30, 2019, which is herein incorporated by reference in its entirety.

TECHNICAL FIELD

This disclosure is directed generally to wireless communication networks and particularly to message transmissions between wireless communication network nodes.

BACKGROUND

Wireless communication technologies are moving the world towards a rapidly increasing network connectivity. High-speed and low-latency wireless communications rely on efficient network resource management and allocation between user mobile stations and wireless access network nodes (including but not limited to wireless base stations). Unlike traditional circuit-switched networks, efficient wireless access networks may not rely on dedicated user channels. Instead, wireless network resources (such as carrier frequencies and transmission time slots) for transmitting voice or other types of data from mobile stations to wireless access network nodes may be allocated on a contention-based random access basis rather than a grant-based fixed access basis.

SUMMARY

In one embodiment, a wireless communication method includes a mobile station determining a requirement to transmit an uplink message to a wireless access node. The uplink message includes a first message part and a second message part. Additionally, the mobile station is configured to transmit the uplink message in a first transmission format or a second transmission format. The method also includes the mobile station determining to transmit the uplink message according to the second transmission format in response to determining that a conflict would occur.

In another embodiment, another wireless communication method includes a mobile station determining a requirement to transmit an uplink message to a wireless access node, which uplink message includes a first message part and a second message part. The mobile station transmits the first message part on a time unit of a first physical channel. The mobile station also determines that transmitting the second message part on a time unit of a second physical channel according to a first transmission format will result in a conflict. In response, the mobile station waits to transmit the second message part until a next time unit of the second physical channel that is configured as an uplink time unit.

In another embodiment, another wireless communication method includes a mobile station determining a requirement to transmit an uplink message to a wireless access node, which uplink message includes a first message part and a second message part. The mobile station transmits the first message part on a time unit of a first physical channel. The mobile station also determines that transmitting the second message part on a time unit group of a second physical channel according to a first transmission format will result in a conflict. In response, the mobile station waits to transmit the second message part until a next time unit group of the second physical channel that is configured as an uplink time unit.

In another embodiment, another wireless communication method includes a mobile station determining a requirement to transmit an uplink message to a wireless access node, which uplink message includes a first message part and a second message part. The mobile station transmits the first message part on a time unit of a first physical channel. The method also includes the mobile station determining that transmitting the second message part on a time unit group of a second physical channel according to a first transmission format will result in a conflict on at least one time unit of the time unit group of the second physical channel. The mobile station then transmits a first portion of the second message part on at least one time unit of the time unit group of the second physical channel that is not conflicted. The mobile station then waits to transmit a remainder of the second message part until a next time unit group of the second physical channel.

In another embodiment, another wireless communication method includes a wireless access node receiving a first message part of a first uplink message on a time unit of a first physical channel from a mobile station and receiving a second message part of the first uplink message on a time unit of a second physical channel from the mobile station. The wireless access node then transmits a third message part of a first downlink message to the mobile station in response to receiving the second message part of the first uplink message according to a first transmission format. The method also includes the wireless access node receiving a first message part of a second uplink message on another time unit of the first physical channel from the mobile station. The wireless access node transmits a third message part of a second downlink message to the mobile station according to a second transmission format in response to determining that the first message part of the second uplink message includes information indicating the mobile station transmitted the first message part of the second uplink message according to the second transmission format.

In another embodiment, another wireless communication method includes a mobile station determining a requirement to transmit an uplink message to a wireless access node, which uplink message includes a first message part and a second message part. The mobile station transmits the first message part on a time unit of a first physical channel. The mobile station then transmits the second message part on a time unit of a second physical channel, wherein the time unit of the second physical channel is at least one uplink time unit and has an offset with respect to the time unit of the first physical channel, wherein the offset is a preset number of time units that are configured as uplink time units after transmitting the first message part on the time unit of the first physical channel.

The above embodiments and other aspects and alternatives of their implementations are described in greater detail in the drawings, the descriptions, and the claims below.

DETAILED DESCRIPTION

Figure 1:
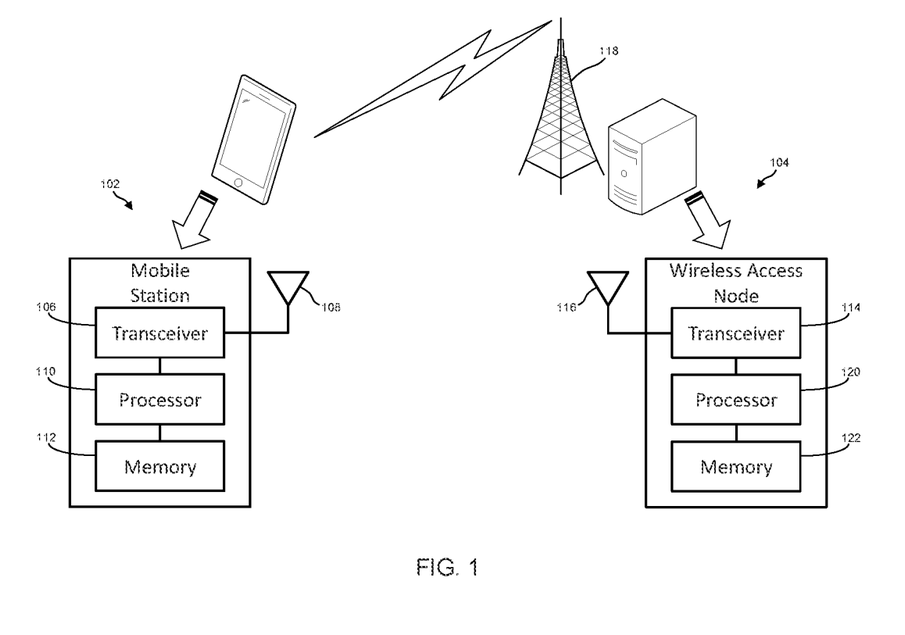
FIG. 1 shows an example system diagram including a mobile station and a wireless access node according to various embodiments.

A wireless access network provides network connectivity between mobile stations and an information or data network (such as a voice communication network or the Internet). An example wireless access network may be based on cellular technologies, which may further be based on, for example, 4G. Long Term Evolution (LTE), 5G. and/or New Radio (NR) technologies and/or formats. FIG. 1 shows an example system diagram including a mobile station 102 and a wireless access node 104 according to various embodiments. The mobile station 102 may comprise a user equipment (UE), which may further include but is not limited to a mobile phone, smart phone, tablet, laptop computer, or other mobile devices that are capable of communicating wirelessly over a network. The mobile station 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless access node 104 may comprise a base station or other wireless network access points capable of communicating wirelessly over a network with one or many mobile stations. For example, the wireless access node 104 may comprise a 4G LTE base station, a 5G NR base station, a 5G central-unit base station, or a 5G distributed-unit base station in various embodiments. The wireless access node 104 may include transceiver circuitry 114 coupled to an antenna 116, which may include an antenna tower 118 in various approaches, to effect wireless communication with the mobile station 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

Figure 2:
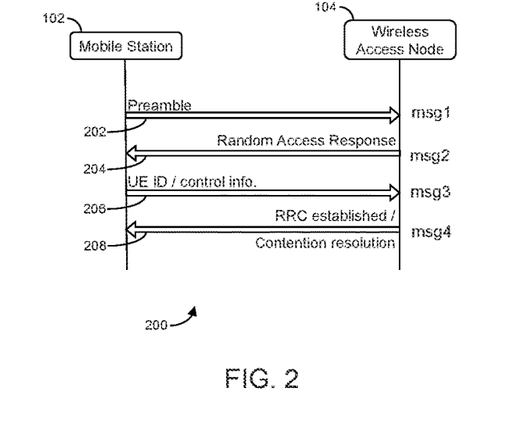
FIG. 2 shows an example of a transmission format procedure for transmissions between a mobile station and a wireless access node.
Figure 3:
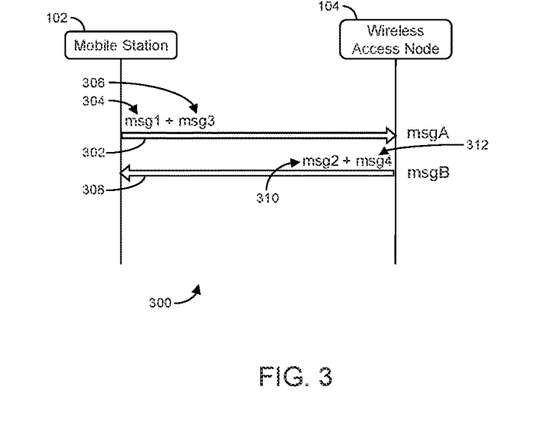
FIG. 3 shows an example of another transmission format procedure for transmissions between a mobile station and a wireless access node.

The wireless access network may provide or employ various transmission formats and protocols for wireless message transmission between the mobile station 102 and the wireless access node 104. FIGS. 2 and 3 show examples of transmission format procedures for transmissions between the mobile station 102 and the wireless access node 104 according to various embodiments. In certain approaches, the wireless access network may employ a random access procedure (e.g., RACH) and interface, wherein a mobile station 102 may request access to the network through a series of message transmissions to and from the wireless access node 104. FIGS. 2 and 3 illustrate a transmission format within the example context for purposes of explanation. For example, FIG. 2 shows an example four-step RACH procedure and FIG. 3 shows an example two-step RACH procedure. However, the transmission formats described with respect to FIGS. 2 and 3 are not limited to the RACH procedure example context and may be used for other message transmission types and protocols.

FIG. 2 shows a four-step transmission format procedure 200 in accordance with various embodiments (which is referred to herein as a "second transmission format"). The mobile station 102 transmits a first message part 202 (i.e., msg1) on a first physical channel to the wireless access node 104, which may include a preamble message in various approaches. Within the example RACH procedure context, the first message part 202 may include a preamble of a RACH request, which may be transmitted on a first physical channel, being a physical random access channel (PRACH). After receiving the first message part 202, the wireless access node 104 transmits a third message part 204 (i.e., msg2) back to the mobile station 102, which may include a recognition message. In the example RACH procedure context, the third message part 204 includes a random access response message.

After receiving the third message part 204, the mobile station 102 transmits a second message part 206 (i.e., msg3), which may be transmitted on a second physical channel, to the wireless access node 104, which second message part 206 may include a payload message in various approaches. Within the example context of a RACH procedure, the second message part 206 may include a payload of a RACH request, including a UE identification and control information, which may be transmitted on a second physical channel, being a physical uplink shared channel (PUSCH). After receiving the second message part 206, the wireless access node 104 transmits a fourth message part 208 (i.e., msg4) back to the mobile station 102, which may include additional information such as configuration information. In the example RACH procedure context, the fourth message part 208 includes a radio resource control (RRC) information and/or contention resolution information (e.g., in an instance where more than one mobile station simultaneously requests RACH access).

The first message part 202 (i.e., msg1) and the second message part 206 (i.e., msg3) together form an uplink message. Similarly, the third message part 204 (i.e., msg2) and the fourth message part 208 (i.e., msg4) together form a downlink message. The terms "channel" and "physical channel" are used herein to broadly refer to network transmission resources, including but not limited to any combination of transmission carrier frequencies and time units. In various examples, a "physical channel" may include instances or occasions of single time units or groups of multiple time units (which multiple time units may be consecutive time units) that are configured or assigned as a particular channel (for example, a PRACH occasion or a PUSCH occasion).

FIG. 3 shows a two-step transmission format procedure 300 in accordance with various embodiments (which is referred to herein as a "first transmission format"). The mobile station 102 transmits an uplink message 302 (i.e., msgA) to the wireless access node 104. In a similar manner as mentioned above, the uplink message 302 includes a first message part 304 (i.e., msg1) and a second message part 306 (i.e., msg3). Similar to the four-step transmission procedure described with respect to FIG. 2, the first message part 304 can be transmitted on a first physical channel to the wireless access node 104, and may include a preamble message in various approaches. Within the example RACH procedure context, the first message part 202 may include the preamble of the RACH request, which may be transmitted on the PRACH channel. Also, the second message part 306 may be transmitted on a second physical channel to the wireless access node 104, which second message part 306 may include a payload message in various approaches. Within the example RACH procedure context, the second message part 306 may include the payload of the RACH request, which may be transmitted on the PUSCH channel.

After receiving the uplink message 302 (i.e., msgA), including both the first message part 304 and the second message part 306, the wireless access node 104 transmits a downlink message 308 (i.e., msgB) to the mobile station 102. In a similar manner as mentioned above, the downlink message 308 includes a third message part 310 (i.e., msg2) and a fourth message part 312 (i.e., msg4). Similar to the four-step transmission procedure described with respect to FIG. 2, the third message part 310 may include a recognition message while the fourth message part 312 may include additional information such as configuration information. In the example RACH procedure context, the third message part 310 includes a random access response message and the fourth message part 312 includes RRC information.

Figure 4:
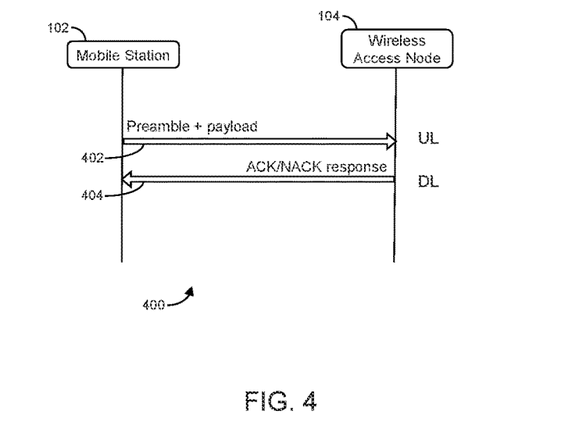
FIG. 4 shows an example of another transmission format procedure for transmissions between a mobile station and a wireless access node.

As mentioned above, although the first transmission format 300 and the second transmission format 200 are described with reference to FIGS. 3 and 2 (respectively), which each illustrate example transmission formats associated with a RACH procedure, the teachings disclosed herein are not limited to RACH procedures, and the described formats and may be implemented with other message transmissions types. For example, the first transmission format (e.g., that as described with respect to FIG. 3) can be used with other message transmission types, as is shown in FIG. 4, which illustrates a two-step transmission format being used in an example uplink grant-free data transmission context. In such a transmission protocol, a payload may be transmitted to the wireless access node 104, for example, prior to or without establishment of an RRC connection. As is shown in the example transmission format 400 of FIG. 4, the mobile station 102 will transmit an uplink message 402 including a preamble and a payload together to the wireless access node 104. After the wireless access node 104 receives both the preamble and the payload portions of the uplink message 402, the wireless access node 104 will then transmit the downlink message 404, which includes a response such as acknowledge or a negative-acknowledgement information, and possibly other information. The first transmission format (two-step transmission format) can be used for other transmission situations and purposes not specifically described here, as well.

The primary difference between the two-step transmission format 300 of FIG. 3 (the "first transmission format") and the four-step transmission format 200 of FIG. 2 (the "second transmission format") is the order of the message transmissions. By using a two-step transmission format 300, the number of back-and-forth transmissions is reduced and wait times between successive transmissions can be reduced or eliminated, thereby improving network access and communication speed. However, using the two-step transmission format can introduce a potential for transmission conflicts with transmission resource configurations.

For use with the methods and embodiments disclosed below (unless otherwise noted), the first transmission format can be considered as comprising the mobile station 102 transmitting the first message part on a first physical channel, transmitting the second message part on a second physical channel after transmitting the first message part, and receiving a downlink message, including the third message part (and the fourth message part, in some approaches), from the wireless access node 104 after transmitting the second message part. Similarly, for use with the methods and embodiments disclosed below (unless otherwise noted), the second transmission format can be considered as comprising the mobile station 102 transmitting the first message part on the first physical channel, receiving the third message part from the wireless access node 104 after transmitting the first message part, and transmitting the second message part on the second physical channel after receiving the third message part.

Figure 5:
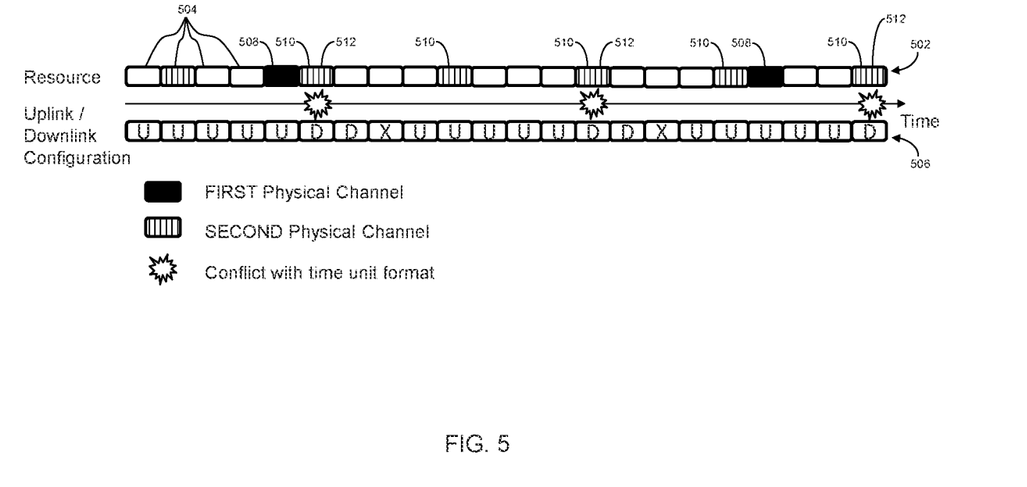
FIG. 5 shows an example configuration of a resource including conflicts at various time units.
Figure 6:
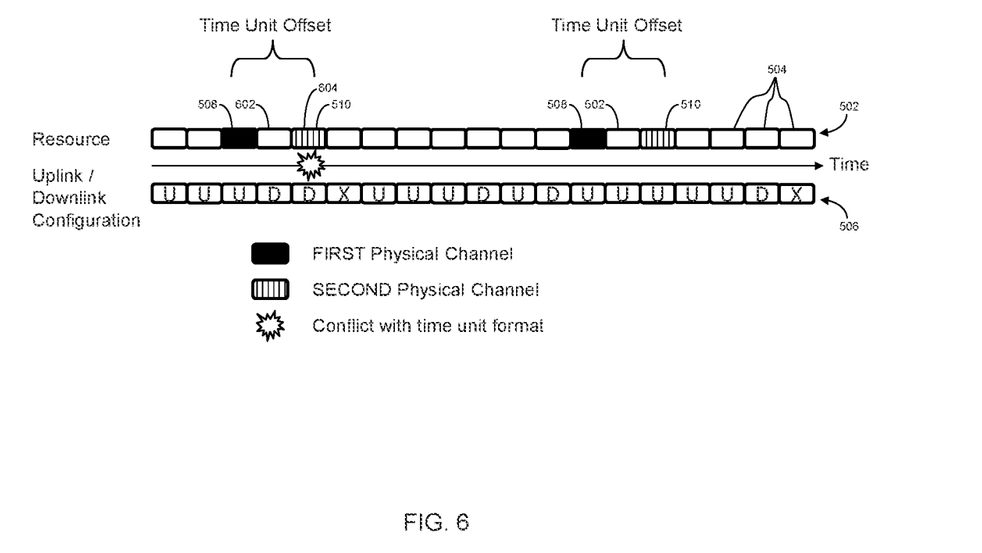
FIG. 6 shows another example configuration of a resource including conflicts at various time units.

FIGS. 5 and 6 show example configurations of a resource for use with a two-step transmission format, including conflicts at various time units. A resource 502 may include a frequency resource, and the mobile station 102 and the wireless access node 104 are configured to communicate with each other by utilizing the resource. The resource 502 may be divided into a plurality of time units 504. The time units 504 may comprise frames, sub-frames, slots, or symbols, and may most specifically comprise slots or symbols in certain embodiments. The individual time units 504 of the resource 502 may be subject to an uplink/downlink configuration 506, wherein each time unit is configured or assigned as an uplink time unit ("U"), a downlink time unit ("D"), or an unknown or variable time unit ("X"). This uplink/downlink configuration 506 may be predetermined or pre-selected, for example, by the wireless access node 104, and may be communicated to the mobile station 102. The uplink/downlink configuration 506 may be a pattern that repeats with a particular periodicity, and may be one of multiple possible patterns available to use by the wireless access node 104 within the wireless access network. Further, more than one resource 502 may be utilized within the wireless access network, each of which may be subject to different or the same uplink/downlink configurations 506.

The resource 502 (which may include multiple resources, such as multiple frequency resources) may be subject to other configurations as well. In certain embodiments, a first subset of individual time units 504 of the resource 502 may be configured as time units 508 of the first physical channel, while a second subset of individual time units may be configured as time units 510 of the second physical channel. In an example RACH procedure context, the first physical channel may include PRACH occasions or time units, while the second physical channel may include PUSCH occasions or time units.

In certain approaches, the first physical channel is configured or assigned according to a preselected or predetermined pattern. The preselected pattern may correlate to the pattern of the uplink/downlink configuration 506 so as to avoid configuring a downlink time unit as a time unit of the first physical channel. The second physical channel may be configured or assigned in at least one of two different manners. In a first approach, as is shown in FIG. 5, the time units 510 of the second physical channel are configured separately from or independent of the time units 508 of the first physical channel. The pattern of the time units 510 of the second physical channel may be different from and possibly independent of the pattern of the time units 508 of the first physical channel so that they appear somewhat random relative to the time units 508 of the first physical channel.

In a second approach, as is shown in FIG. 6, the time units 510 of the second physical channel are configured or assigned based on a relative location (in time and/or frequency) with respect to the time units 508 of the first physical channel, possibly with a time unit offset. For example, the time unit 510 of the second physical channel may be configured as a direct next time unit following the time unit 508 of the first physical channel (e.g., with a time unit offset of zero). Or the time unit 510 of the second physical channel may be configured as a time unit that is offset from the time unit 508 of the first physical channel by at least one offset time unit 602 (e.g., with a time unit offset of one or more), as is shown in FIG. 6.

In either approach, the pattern of the time units of the second physical channel may not directly correlate to the pattern of the uplink/downlink configuration 506 and there may be instances where a downlink time unit is also configured as a time unit of the second physical channel. In such a situation, a conflict exists for that time unit. For example, in FIG. 5, the time units 512 (with the conflict symbols) are time units that are configured both as a downlink time unit ("D") and a time unit 510 of the second physical channel, and thus are in conflict (as the mobile station 102 cannot transmit on the time unit of the second physical channel if it is also configured as a downlink time unit). Similarly, in FIG. 6, the time unit 604 (with the conflict symbol) is a time unit that is configured both as a downlink time unit ("D") and a time unit 510 of the second physical channel, and thus is in conflict. However, the other time unit 510 of the second physical channel shown in FIG. 6 is configured as an uplink time unit ("U") and thus is not in conflict.

The conflicts may occur due to different patterns of the uplink/downlink configuration 506 and the time units 510 of the second physical channel. Additionally, these conflicts may occur when the uplink/downlink configuration 506 has a first pattern with a first periodicity and the time units 510 of the second physical channel 510 have a second pattern with a second periodicity that is different from the first periodicity, such that the first pattern and the second pattern shift relative to one another, causing conflicts. To account for the potential for such conflicts while using a two-channel, multiple different solutions are disclosed below.

Figure 7:
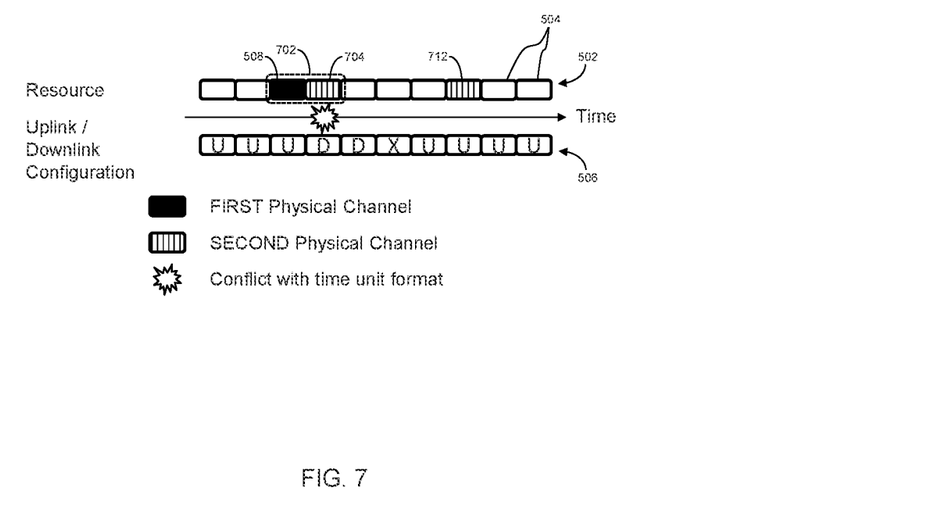
FIG. 7 shows example methods to avoid transmission conflicts according to various embodiments.

FIG. 7 shows example methods to avoid transmission conflicts according to various embodiments. The resource 502 is configured as discussed above with regard to FIG. 5 or 6. The mobile station 102 may determine a requirement to transmit an uplink message to the wireless access node 104 (which may occur in each of the embodiments disclosed here). For example, in the example RACH procedure context, the mobile station 102 may determine that it would like to access the wireless access network using a random access channel request and needs to send an uplink message including a PRACH message and a PUSCH message. The mobile station 102 may be configured to transmit the uplink message in either the first transmission format (two-step transmission) or the second transmission format (four-step transmission), and, in some embodiments, may default to using the first transmission format when possible. However, the mobile station 102 may determine that transmitting the uplink message according to the first transmission format will result in a conflict, for example, the second message part being transmitted on a time unit 704 of the second physical channel that is also configured as a downlink time unit, thereby causing a conflict.

As is shown in FIG. 7, an example uplink message 702 that may be transmitted according to the first transmission format (two-step) is shown, including a first message part that would be transmitted on a time unit 508 of the first physical channel, and a second message part that would be transmitted on a time unit 704 of the second physical channel after transmitting the first message part. However, if the mobile station 102 were to transmit the uplink message 702 in the first transmission format, the second message part would be transmitted on the time unit 704 of the second physical channel that is configured as a downlink ("D") time unit, thereby resulting in a conflict.

In one embodiment, instead of transmitting the uplink message 702 according to the first transmission format (two-step), the mobile station 102 determines to transmit the uplink message according to the second transmission format (four-step). The mobile station 102 then transmits the first message part on the time unit 508 of the first physical channel, but does not transmit the second message part. Instead, as outlined in FIG. 2, after transmitting the first message part, the mobile station 102 waits to receive the third message part from the wireless access node 104 and, after receiving the third message part, transmits the second message part on a time unit of the second physical channel after receiving the third message part. In this manner, the uplink message is transmitted to the wireless access node 104 according to the second transmission format without conflicts.

Figure 8:
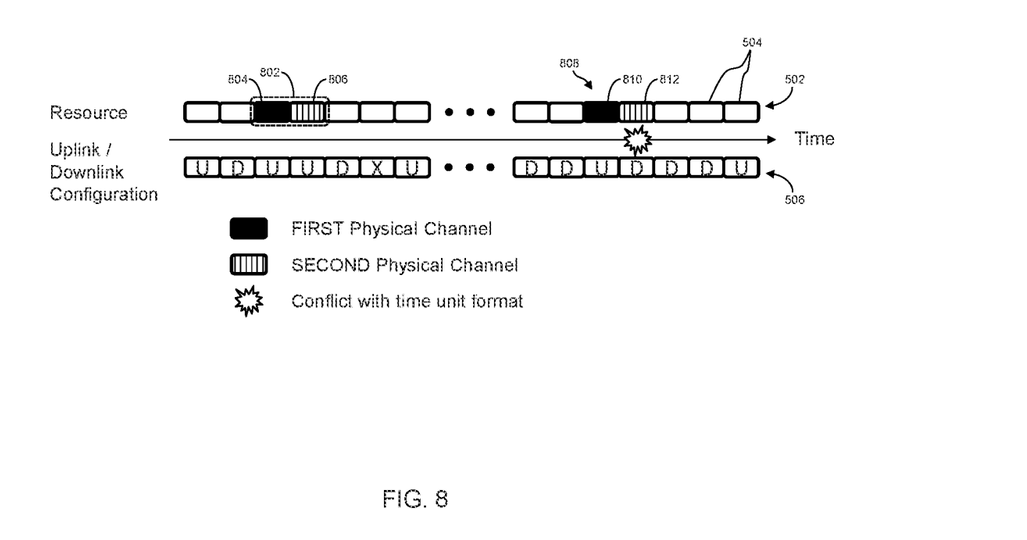
FIG. 8 shows another example method to avoid transmission conflicts according to various embodiments.

Turning to FIG. 8, in another embodiment, the wireless access node 104 also performs a method to avoid transmission conflicts in concert with the mobile station 102 performing the approach discussed directly above. As with the mobile station 102, the wireless access node 104 is also configured to receive uplink messages and transmit downlink messages in either the first transmission format (two-step) or the second transmission format (four-step). In one example, the wireless access node 104 may receive a first message part of a first uplink message 802 on a time unit 804 of the first physical channel from the mobile station 102, and subsequently receive a second message part of the first uplink message 802 on a time unit 806 of the second physical channel. The wireless access node 104 is configured to understand that receiving these two message parts, particularly if transmitted in an expected manner (e.g., at appropriate time units) indicates the uplink message was transmitted according to the first transmission protocol. Alternatively, the first message part may include information indicating the mobile station 102 transmitted the first message part of the first uplink message 802 according to the first transmission format (two-step), and the wireless access node 104 may review this information. In response to receiving the first uplink message 802 (including the second message part), the wireless access node 104 will transmit a first downlink message, including a third message part (and a fourth message part, in some approaches) to the mobile station 102 in accordance with the first transmission format (see FIG. 3).

At a different time, the wireless access node 104 may also begin the process of receiving a second uplink message 808 including receiving a first message part on a time unit 810 of the first physical channel from the mobile station 102. However, the second message part was not transmitted on the time unit 812 of the second physical channel on which it would normally be transmitted due to a conflict with the uplink/downlink configuration 506 for that time unit 812. Accordingly, the wireless access node 104 determines to operate according to the second transmission format instead. In one example, the wireless access node 104 determines that the first message part of the second uplink message 808 includes information indicating the mobile station 102 transmitted the first message part according to the second transmission format. In another example, like the mobile station 102, the wireless access node 104 also knows the uplink/downlink configuration 506 and would recognize that the mobile station 102 could not transmit the second message part of the second uplink message 808 at the time unit 812 of the second physical channel that would typically be used in the first transmission format and will instead switch to the second transmission format. In response to determining the mobile station 102 sent the first message part according to the second transmission format (four-step), the wireless access node transmits the third message part of a second downlink message to the mobile station 102, and thereafter receives from the mobile station 102 a second message part of the second uplink message 808 on a time unit of the second physical channel (see FIG. 2). So configured, the wireless access node 104 can determine whether to operate in the first or the second transmission formats based on transmissions received from the mobile station 102.

Returning to FIG. 7, in a second embodiment, the mobile station 102 utilizes other time units of the second physical channel to transmit the second message part of the uplink message. As with the first embodiment, the mobile station 102 determines that transmitting the uplink message according to the first transmission format (two-step) will result in a conflict, such as the second message part being transmitted on a time unit 704 of the second physical channel that is also configured as a downlink time unit. The mobile station 102 transmits the first message part on a time unit 508 of the first physical channel. However, in this embodiment, instead of transmitting the second message part on the conflicting time unit 704 of the second physical channel, in response to determining that a conflict would occur, the mobile station 102 waits to transmit the second message part until a next time unit 712 of the second physical channel that is also configured as an uplink time unit ("U"), which is not a conflict. Then, the mobile station 102 transmits the second message part to the wireless access node 104 on the next time unit 712 of the second physical channel. As such, conflicts are avoided. After transmitting the second message part, the mobile station 102 subsequently receives the downlink message, including the third message part (and a fourth message part, in some approaches), from the wireless access node 104 (see FIG. 3). For example, in the example RACH procedure context, if the reserved PUSCH resource for two-step RACH procedure cannot be used for uplink transmission, the mobile station 102 can postpone the transmission of the payload to the next available reserved PUSCH resource.

In certain approaches, the wireless access node 104 will be similarly configured to operate according to the second embodiment disclosed directly above. For example, as mentioned above, the wireless access node 104 begins the process of receiving an uplink message including receiving a first message part on a time unit 508 of the first physical channel from the mobile station 102. However, the second message part was not transmitted on the time unit 704 of the second physical channel on which it would normally be transmitted due to a conflict with the uplink/downlink configuration 506 for that time unit 704. Instead, the wireless access node 104 must know that it is to expect the second message part on a next time unit 712 of the second physical channel. In one example, like the mobile station 102, the wireless access node 104 also knows the uplink/downlink configuration 506 and would recognize that the mobile station 102 could not transmit the second message part on the time unit 704 of the second physical channel that would typically be used in the first transmission format and will instead wait for the next time unit 712 of the second physical channel on which to receive the second message part. In response to receiving the second message part on the next time unit 712 of the second physical channel, the wireless access node 104 will transmit a downlink message, including a third message part (and a fourth message part, in some approaches), to the mobile station 102 in accordance with the first transmission format (see FIG. 3). So configured, the wireless access node 104 can determine when to expect to receive second message parts when operating using the first transmission format (two-step) to avoid conflicts.

Figure 9:
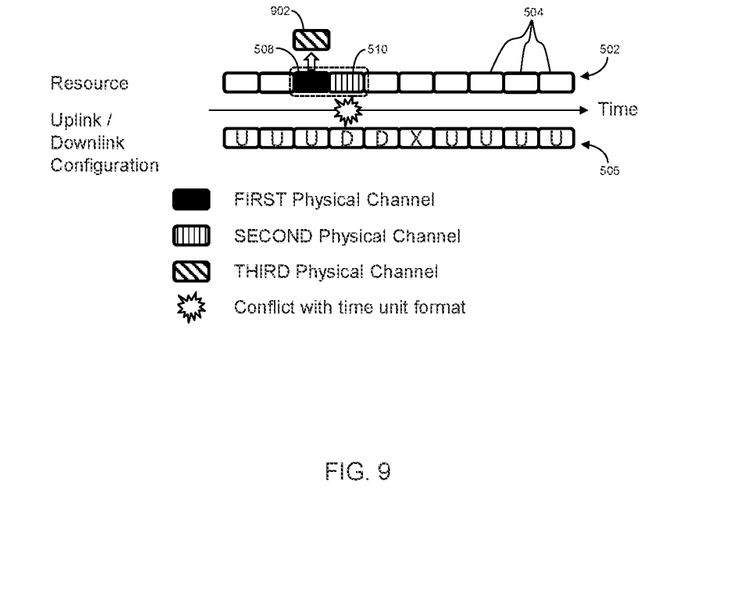
FIG. 9 shows another example method to avoid transmission conflicts according to various embodiments.

FIG. 9 shows another example method to avoid transmission conflicts according to a third embodiment. Similar to FIG. 7, the resource 502 is configured such that a first subset of individual time units 504 of the resource 502 may be configured as time units 508 of the first physical channel, while a second subset of individual time units may be configured as time units 510 of the second physical channel. However, in this embodiment, a third subset of the plurality of the time units 514 may be configured as time units 902 of a third physical channel, which may be a different transmission channel (frequency and/or sequence/code) than the first physical channel. Further, in this embodiment, the first transmission format includes transmitting the first message part on a time unit 508 of the first physical channel, whereas the second transmission format includes transmitting the first message part on a time unit 902 of the third physical channel instead of the time unit 508 of the first physical channel. For example, in the example RACH procedure context, the first transmission channel may be a PRACH channel (e.g., PRACH time units) dedicated for the two-step RACH format (first transmission format), whereas the third transmission channel may be a different PRACH channel dedicated for the four-step RACH format (second transmission format). The time units 510 of the second physical channel may again be PUSCH occasions or time units.

Similar to FIG. 7, in the embodiment of FIG. 9, the mobile station 102 may determine a requirement to transmit an uplink message to the wireless access node 104. Again, the mobile station 102 may determine that transmitting the uplink message according to the first transmission format will result in a conflict, such as the second message part being transmitted on a time unit 510 of the second physical channel that is also configured as a downlink time unit ("D").

In response, instead of transmitting the uplink message according to the first transmission format (two-step), the mobile station 102 determines to transmit the uplink message according to the second transmission format (four-step). To do this, in this embodiment, the mobile station 102 transmits the first message part on the time unit 902 of the third physical channel in accordance with the second transmission format, instead of transmitting the first message part on the time unit 508 of the first physical channel in accordance with the first transmission format. In so doing, the mobile station 102 initiates communication with the wireless access node 104 according to the second transmission format (four-step). Accordingly, the mobile station 102 receives the third message part from the wireless access node after transmitting the first message part, and subsequently transmits the second message part on a time unit of the second physical channel to the wireless access node after receiving the third message part (see FIG. 3).

One distinction between the solution of FIG. 9 and the solutions of FIG. 7 is that, in the solution of FIG. 9, the second transmission format includes the mobile station 102 transmitting the first message part on a time unit 902 of the third physical channel, which may be a different transmission channel (frequency and/or sequence/code) than the first physical channel on which the first message part would be transmitted according to the first transmission format. For example, in the example RACH procedure context, if a reserved PUSCH resource for two-step RACH procedure cannot be used for uplink transmission, the mobile station 102 may fall back to four-step RACH procedure by transmitting a preamble that is configured for four-step RACH on a reserved PRACH resource for four-channel RACH. Conversely, in the solution of FIG. 7, the mobile station 102 may transmit the first message part on the same first physical channel, whether it is transmitted according to the first transmission format (two-step) or the second transmission format (four-step). For example, in the embodiments of FIG. 7 in the example RACH procedure context, the first transmission channel may be a PRACH channel (e.g., PRACH time units) dedicated for two-step RACH format, but may also be used for four-step RACH format. As such, if the reserved PUSCH resource for two-step RACH procedure cannot be used for uplink transmission, the mobile station 102 may transmit only the preamble on a PRACH resource that is used in two-step RACH and may withhold transmitting the payload on the PUSCH message.

In certain approaches, the wireless access node 104 is similarly configured to operate according to the third embodiment disclosed directly above. For example, the wireless access node 104 is configured to recognize which channel it receives a first message part on as indicating which transmission format to utilize. For example, if the wireless access node 104 receives the first message part on the time unit 508 of the first physical channel, then the wireless access node 104 will recognize that the uplink message is being transmitted according to the first transmission format and will operate accordingly. Conversely, if the wireless access node 104 receives the first message part on the time unit 902 of the third physical channel, then the wireless access node 104 will recognize that the uplink message is being transmitted according to the second transmission format and will operate accordingly.

Figure 10:
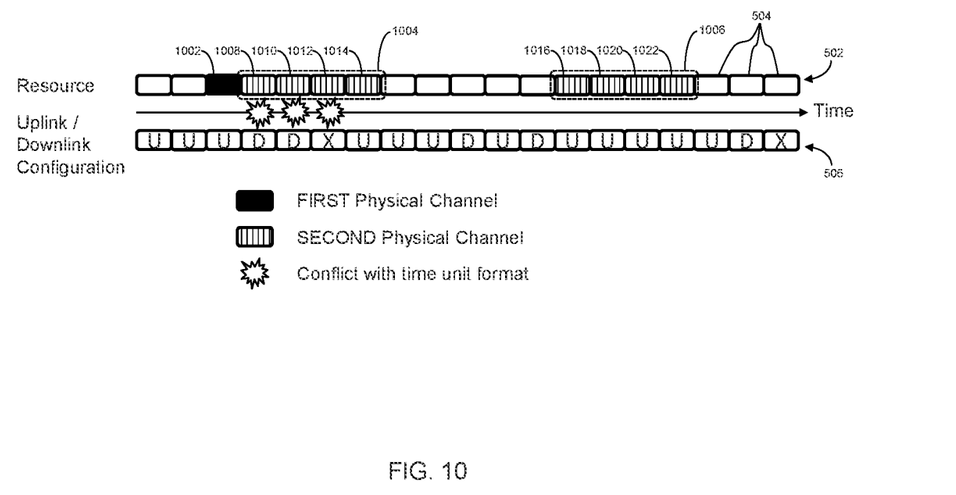
FIG. 10 shows additional example methods to avoid transmission conflicts according to various embodiments.

FIG. 10 shows additional example methods to avoid transmission conflicts according to various embodiments. The resource 502 is configured as discussed above with regard to FIG. 5 or 6, wherein a first subset of individual time units 504 of the resource 502 may be configured as time units 1002 of the first physical channel, while a second subset of time units may be configured as time unit groups 1004 and 1006 of the second physical channel. However, in the embodiments of FIG. 10, the time unit groups 1004 and 1006 of the second physical channel each comprise two or more consecutive time units. For example, a time unit group 1004 of the second physical channel includes time units 1008, 1010, 1012, and 1014, whereas a next time unit group 1006 of the second physical channel includes time units 1016, 1018, 1020, and 1022. Although each time unit group 1004 and 1006 of the second physical channel is illustrated as having four individual time units, the time unit groups of the second physical channel may include any number of time units.

In various embodiments of FIG. 10, the mobile station 102 determines that transmitting the uplink message according to the first transmission format (two-step) will result in a conflict. The mobile station 102 may make this determination by determining that at least one of time unit (e.g., time units 1008, 1010, 1012, or 1014) of the time unit group 1004 of the second physical channel is configured as a downlink time unit. In the example of FIG. 10, time units 1008, 1010, and 1012 are all configured as downlink ("D") time units or unknown ("X") time units, and therefore a conflict exists with respect to time unit group 1004 of the second physical channel overall.

The mobile station 102 transmits the first message part on a time unit 1002 of the first physical channel. However, in a fourth embodiment, instead of transmitting the second message part on the conflicting time unit group 1004 of the second physical channel, the mobile station 102 waits to transmit the second message part until a next time unit group 1006 of the second physical channel where all of the time units of the next time unit group 1006 of the second physical channel are also configured as uplink time units ("U"), which is not a conflict. As is shown in the example of FIG. 10, the time units 1016, 1018, 1020, and 1022 of the next time unit group 1006 of the second physical channel are all configured as uplink time units ("U"), so that no conflict exists. Then, the mobile station 102 transmits the second message part to the wireless access node 104 on the next time unit group 1006 of the second physical channel. As such, conflicts for transmitting the second message part are avoided. After transmitting the second message part, the mobile station 102 subsequently receives a downlink message including the third message part (and a fourth message part, in some approaches) from the wireless access node 104 (see FIG. 3).

With continued reference to FIG. 10, in a fifth embodiment, the mobile station 102 may determine a time unit group 1004 of the second physical channel on which to transmit the second message part according to the first transmission format. For example, as with the previous embodiments, the mobile station 102 is configured to determine that, using the first transmission format, it would typically use the time unit group 1004 of the second physical channel to transmit the second message part. However, as with the fourth embodiment, above, the mobile station 102 determines that transmitting the second message part on the time unit group 1004 of the second physical channel will result in a conflict on at least one of the time units of the time unit group 1004. For example, the mobile station 102 may determine that at least one of the time units of the time unit group 1004 of the second physical channel is configured as a downlink time unit, and thus is conflicted. In the example of FIG. 10, the mobile station 102 determines that time units 1008, 1010, and 1012 are all configured as downlink ("D") time units or unknown ("X") time units, and therefore a conflict exists with respect those specific time units. However, the mobile station 102 also determines that at least one other of the time units of the time unit group 1004 of the second physical channel is configured as an uplink time unit. In the example of FIG. 10, the mobile station 102 determines that time unit 1014 is configured as an uplink time unit, and therefore no conflict exists with respect to time unit 1014.

The mobile station 102 transmits the first message part on the time unit 1002 of the first physical channel, as would typically occur according to the first transmission format.

However, with respect to the second message part, the mobile station 102 transmits only a first portion of the second message part on the at least one time unit of the time unit group 1004 of the second physical channel that is configured as an uplink time unit. In the example of FIG. 10, the mobile station 102 will only transmit one time unit's worth of data of the second message (e.g., the first portion of the second message) on the non-conflicted time unit 1014 of the time unit group 1004 of the second physical channel.

After transmitting the first portion, the mobile station 102 waits to transmit a remainder of the second message part until a next time unit group 1006 of the second physical channel that is not conflicted, for example, that includes at least one time unit that is configured as an uplink time unit. In the example of FIG. 10, the mobile station determines that the next time unit group 1006 of the second physical channel includes at least one time unit that is also configured as an uplink time unit. In this case, all the time units 1016, 1018, 1020, and 1022 of the next time unit group 1006 of the second physical channel are configured as uplink time units, thus no conflict exists with regard to all of those time units. Alternatively, the mobile station 102 may determine that the next time unit group 1006 of the second physical channel includes enough uplink configured time units to be able to transmit the remainder of the second message part. In the example of FIG. 10, the mobile station 102 may determine that, after transmitting the first part of the second message on the single non-conflicted time unit 1014 of the time unit group 1004 of the second physical channel, it still needs to transmit three more time units' worth of data of the second message part in the next time unit group 1006 of the second physical channel. The mobile station 102 determines that there are four available time units that are not conflicted (i.e., time units 1016, 1018, 1020, and 1022) in the next time unit group 1006 of the second physical channel, and determines that this is at least as many time units as are required to transmit the remainder of the second message part.

The mobile station 102 then transmits the remainder of the second message part on the at least one time unit that is configured as an uplink time unit (i.e., that is not conflicted) of the next time unit group 1006 of the second physical channel. In the example of FIG. 10, the mobile station 102 transmits the remaining second through fourth subparts of the second message part on time units 1016, 1018, and 1120, respectively. In other examples, the mobile station 102 may allow the second message part to span across more than two time unit groups of the second physical channel.

This fifth embodiment is different from the fourth embodiment, above, wherein the mobile station 102 would simply skip the entire conflicted time unit group 1004 of the second physical channel if any of its individual time units are conflicted, and instead transmits the second message part only on the next time unit group 1006 of the second physical channel. Instead, in this fifth embodiment, the mobile station 102 will allow the second message part to be separated and transmitted on two different time unit groups of the second physical channel, with a first part being transmitted on the time unit group 1004 of the second physical channel and the remainder part being transmitted on the next time unit group 1006 of the second physical channel. In this manner, the mobile station 102 transmits the second message part as quickly as possible to the wireless access node 104, using available time units within the time unit groups of the second physical channel, even if they are not consecutive.

In certain approaches, the wireless access node 104 will be similarly configured to operate according to the fourth and fifth embodiments disclosed directly above. For example, as mentioned above, the wireless access node 104 begins the process of receiving an uplink message including receiving a first message part on a time unit 1002 of the first physical channel from the mobile station 102. However, with regard to the second message part, the wireless access node 104 also knows the uplink/downlink configuration 506 and would recognize that the mobile station 102 could not transmit the second message part on the time unit group 1004 of the second physical channel that would typically be used in the first transmission format. Instead, according to the fourth embodiment, the wireless access node 104 will wait for the next time unit group 1006 of the second physical channel on which to receive the second message part. Alternatively, according to the fifth embodiment, the wireless access node 104 will receive a first part of the second message on the at least one time unit that is configured as an uplink time unit (1014) of the time unit group 1004 of the second physical channel, and will receive the remainder of the second message part on the at least one time unit that is configured as an uplink time unit (1016, 1018, and 1020) of the next time unit group 1006 of the second physical channel. As such, in either of the fourth or fifth embodiments, the wireless access node 104 will recognize and understand the received data transmitted on the time unit groups of the second physical channel, even if they are in a different location than would be typically transmitted according to the first transmission format.

In response to receiving the second message part on one or both of the time unit group 1004 of the second physical channel or the next time unit group 1006 of the second physical channel, the wireless access node 104 will transmit a downlink message including a third message part (and a fourth message part, in some approaches) to the mobile station 102 in accordance with the first transmission format (see FIG. 3). So configured, the wireless access node 104 can determine when to expect to receive second message parts when operating using the first transmission format (two-step) to avoid conflicts.

Figure 11:
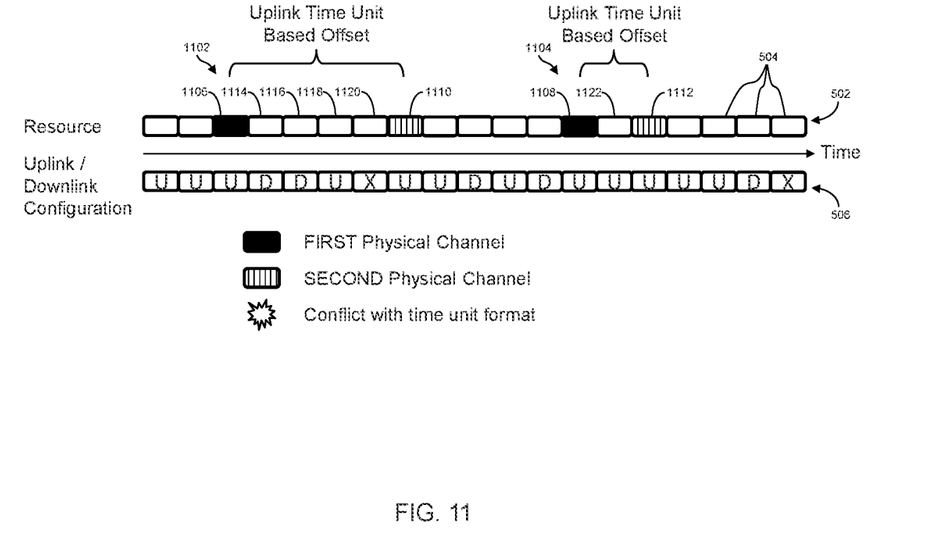
FIG. 11 shows another example method to avoid transmission conflicts according to various embodiments.

FIG. 11 shows another example method to avoid transmission conflicts according to a sixth embodiment when using the first transmission method. The resource 502 is configured in a similar manner as discussed above, where individual time units 504 are subject to an uplink/downlink configuration 506, and wherein a first subset of individual time units 504 may be configured as time units 1106 and 1108 of the first physical channel. In this embodiment, however, the time units 1110 and 1112 of the second physical channel are configured or assigned based on a relative location (in time and/or frequency) with respect to the time units 1106 and 1108 of the first physical channel with an uplink time unit based offset. That is, only uplink time units ("U") are counted toward the offset, while downlink time units ("D") and unknown time units ("X") are not counted toward the offset. Thus, the mobile station 102 transmits the second message part on a time unit of the second physical channel that is at least one uplink time unit and has an offset with respect to the time unit of the first physical channel, wherein the offset is a preset number of time units that are configured as uplink time units after transmitting the first message part on the time unit of the first physical channel. By this, the time unit of the second physical channel is always configured or assigned to be on an uplink time unit.

For example, in the first example 1102 illustrated in FIG. 11, the mobile station 102 transmits the first message part on the time unit 1106 of the first physical channel. The mobile station 102 then transmits the second message part on a time unit 1110 of the second physical channel that has an offset of a preset number of time units (e.g., two) that are configured as uplink time units after the time unit 1106 of the first physical channel. Time units 1114, 1116, and 1120 are not configured as uplink time units, so they are not counted toward the offset. However, time unit 1118 is configured as an uplink time unit and is therefore counted as the first uplink time unit following the time unit 1106 of the first physical channel. The second time unit that is configured as an uplink time unit is then configured as the time unit 1110 of the second physical channel.

Similarly, in the second example 1104 illustrated in FIG. 11, the mobile station 102 transmits the first message part on the time unit 1108 of the first physical channel. The mobile station 102 then transmits the second message part on a time unit 1112 of the second physical channel that has an offset of a preset number of time units (e.g., two) that are configured as uplink time units after the time unit 1108 of the first physical channel. Time unit 1122 is configured as an uplink time unit and is therefore counted as the first uplink time unit following the time unit 1108 of the first physical channel. The second time unit that is configured as an uplink time unit is then configured as the time unit 1112 of the second physical channel.

In certain embodiments, the preset number of uplink time units after transmitting the first message part may be as low as one (meaning, the time unit of the second physical channel may be the next subsequent uplink time unit after the time unit of the first physical channel, also meaning that an uplink time unit based offset may is zero). Alternatively, the preset number of uplink time units after transmitting the first message part may be two or more (meaning, there is at least one uplink time unit between the time unit of the first physical channel and the time unit of the second physical channel, also meaning that the uplink time unit based offset is one or greater). If the present number of uplink time units after transmitting the first message part is two or more, those uplink time units may be counted whether or not they are consecutive time units, as is shown in the first example 1102. However, in another approach, those uplink time units may be required to be consecutive in order to be counted, as is shown in the second example 1104.

In certain approaches, the wireless access node 104 will be similarly configured to operate according to the sixth embodiments disclosed directly above. For example, as mentioned above, the wireless access node 104 begins the process of receiving an uplink message including receiving a first message part on a time unit 1106 of the first physical channel 1106 from the mobile station 102. However, with regard to the second message part, the wireless access node 104 also knows the uplink/downlink configuration 506 and would likewise have configured the time unit 1110 of the second physical channel to have an offset of a preset number of uplink time units following the time unit of the first physical channel (e.g., the second uplink time unit after the time unit of the first physical channel). In fact, the wireless access node 104 may dictate this requirement and configuration or arrangement of the time unit of the second physical channel relative to the time unit of the first physical channel, and may communicate the requirement down to the mobile station 102. Subsequently, the wireless access node 104 will receive the second message part on the time unit 1110 of the second physical channel. In response to receiving the second message part on the time unit 1110 of the second physical channel, the wireless access node 104 will transmit a downlink message including a third message part (and a fourth message part, in some approaches) to the mobile station 102 in accordance with the first transmission format (see FIG. 3).

Although applicable to many different message transmission types and procedures, each of the above described methods and embodiments may be implemented in a random access channel request (RACH) procedure, wherein the first physical channel includes a PRACH occasion and the second physical channel includes a PUSCH occasion, and wherein the first message part comprises a PRACH message (including a preamble message) and the second message part comprises a PUSCH message (including a payload message). Further, in each of the above-described methods and embodiments, the wireless access node 104 may establish patterns for the uplink/downlink configuration 506, the pattern of the time units of the first physical channel, and the pattern for the time units of the third physical channel. Additionally, each of the above described methods and embodiments are usable in a situation where the time unit of the second physical channel is configured separately from the first physical channel (e.g., as explained with regard to FIG. 5) or in a situation where the time unit of the second physical channel is configured based on a relative location with respect to the time unit of the first physical channel, possibly with a time unit offset (e.g., as explained with regard to FIG. 6). However, the sixth embodiment includes a solution that provides a new configuration protocol for the time unit of the second physical channel all together.

In various embodiments, as illustrated in FIG. 1, the mobile station 102 includes a processor 110 and a memory 112, wherein the processor 110 is configured to read computer code from the memory 112 to implement any of the methods and embodiments disclosed above relating to operations of the mobile station 102. Similarly, the wireless access node 104 includes a processor 120 and a memory 122, wherein the processor 120 is configured to read computer code from the memory 122 to implement any of the methods and embodiments disclosed above relating to operations of the wireless access node 104. Also, in various embodiments, a computer program product includes a non-transitory computer-readable program medium (e.g., memory 112 or 122) with computer code stored thereupon. The computer code, when executed by a processor (e.g., processor 110 or 120), causes the processor to implement a method corresponding to any of the embodiments disclosed above.

In accordance with the various methods and embodiments disclosed above, various technical advantages are realized. For example, by allowing the mobile station 102 and the wireless access node 104 to be capable of operating with different transmission formats according to some embodiments, or by configuring the transmission channels in other embodiments, the system remains flexible and efficient, while maintaining resource integrity by avoiding conflicts during message transmissions.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B. and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A wireless communication method comprising:
   determining, by a mobile station, a request to obtain random access in a wireless communication network and to transmit the request and an uplink message to a wireless access node, the request and uplink message comprising a first message part and a second message part, wherein the mobile station is configured to initiate the random access and a transmission of the request and the uplink message in one of a first transmission format or a second transmission format; and
   initiating, by the mobile station, the random access and the transmission of the request and the uplink message according to the second transmission format in response to determining that a conflict would occur, and otherwise initiating the random access and the transmission of the request and the uplink message according to the first transmission format.

2. The wireless communication method of claim 1, wherein the first transmission format comprises the mobile station transmitting the first message part on a time unit of a first physical channel, transmitting the second message part on a time unit of a second physical channel after transmitting the first message part, and receiving a downlink message from the wireless access node after transmitting the second message part; and
   wherein the second transmission format comprises the mobile station transmitting the first message part on a time unit of the first physical channel, receiving a third message part from the wireless access node after transmitting the first message part, and transmitting the second message part on a time unit of the second physical channel after receiving the third message part.

3. The wireless communication method of claim 2, further comprising:
   transmitting, by the mobile station to the wireless access node, the first message part on the time unit of the first physical channel;
   receiving, by the mobile station from the wireless access node, the third message part after transmitting the first message part; and
   transmitting, by the mobile station to the wireless access node, the second message part on the time unit of the second physical channel after receiving the third message part.

4. The wireless communication method of claim 1, wherein the mobile station determining that the conflict would occur further comprises the mobile station determining that transmitting the uplink message according to the first transmission format would result in the second message part being transmitted on a time unit of a second physical channel that is also configured as a downlink time unit.

5. The wireless communication method of claim 1, wherein the mobile station and the wireless access node communicate by utilizing at least one frequency resource comprising a plurality of time units, wherein individual time units of the plurality of time units are configured as at least one of an uplink time unit or a downlink time unit.

6. The wireless communication method of claim 1, wherein the mobile station and the wireless access node communicate by utilizing at least one frequency resource comprising a plurality of time units, wherein a first subset of the plurality of time units are configured as time units of a first physical channel, and wherein a second subset of the plurality of time units are configured as time units of a second physical channel.

7. The wireless communication method of claim 5, wherein the plurality of time units comprise slots or symbols.

8. The wireless communication method of claim 2, wherein the first physical channel comprises a PRACH occasion, and wherein the second physical channel comprises a PUSCH occasion.

9. The wireless communication method of claim 8, wherein the first message part comprises a random access preamble message and the second message part comprises a random access payload message.

10. The wireless communication method of claim 1, wherein the first message part comprises a PRACH message and the second message part comprises a PUSCH message.

11. The wireless communication method of claim 2, wherein the time unit of the second physical channel for transmitting the second message part is configured as a direct next time unit following the time unit of the first physical channel or a third physical channel for transmitting the first message part or a time unit that is offset from the time unit of the first physical channel for transmitting the first message part by at least one offset time unit.

12. The wireless communication method of claim 1, wherein the mobile station determining that there is no conflict when the mobile station determines that transmitting the uplink message according to the first transmission format would result in the second message part being transmitted on a time unit of a second physical channel that is configured as an uplink time unit.

* * * * *